United States Patent
Dhuse

(10) Patent No.: US 11,237,829 B2
(45) Date of Patent: Feb. 1, 2022

(54) PERFORMING COMPOSABLE TRANSACTIONS IN A DISPERSED STORAGE NETWORK

(71) Applicant: International Business Machines Corporation, Armonk, NY (US)

(72) Inventor: Greg R. Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 428 days.

(21) Appl. No.: 16/274,493

(22) Filed: Feb. 13, 2019

(65) Prior Publication Data

US 2020/0257528 A1 Aug. 13, 2020

(51) Int. Cl.
| | |
|---|---|
| *G06F 9/30* | (2018.01) |
| *G06F 3/06* | (2006.01) |
| *G06F 16/23* | (2019.01) |
| *G06F 21/62* | (2013.01) |
| *H04L 29/06* | (2006.01) |
| *H04L 29/08* | (2006.01) |

(52) U.S. Cl.
CPC .......... *G06F 9/30032* (2013.01); *G06F 3/062* (2013.01); *G06F 3/067* (2013.01); *G06F 3/0638* (2013.01); *G06F 16/23* (2019.01); *G06F 16/2365* (2019.01)

(58) Field of Classification Search
CPC .. G06F 16/23; G06F 16/2365; G06F 9/30032; G06F 3/062; G06F 3/0638; G06F 3/067; G06F 21/62; H04L 63/101; H04L 63/08; H04L 67/1097
See application file for complete search history.

(56) References Cited

U.S. PATENT DOCUMENTS 8,255,373 B2 * 8/2012 McKelvie ............... G06F 9/526
707/704
9,575,890 B2 * 2/2017 Busaba ............... G06F 12/0284
(Continued)

OTHER PUBLICATIONS

Anonymous; Combining Multiple Intent Operations into a Single Write; ip.com; IP.com No. IPCOM000248630D; Dec. 22, 2016; 2 pgs.
(Continued)

*Primary Examiner* — Dennis Truong
(74) *Attorney, Agent, or Firm* — Anthony England; Andrew D. Wright; Roberts Calderon Safran & Cole, P.C.

(57) ABSTRACT

A method for execution by a dispersed storage and task (DST) processing unit includes initializing a composite operation from a plurality of independent operations. An empty transaction context is created by performing an evaluation of the composite operation. A multi-source compare and swap (CASN) transaction is created from resulting expected values determined by evaluating the composite operation in the empty transaction context. The CASN transaction is executed against a dispersed storage network (DSN) memory. When the execution of the CASN transaction is successful, the transaction is committed to the DSN memory. When the execution failed due to at least one conflicting value stored in the DSN memory, a new transaction context pre-populated with the at least one conflicting value is created, and an updated CASN for the composite operation that utilizes the new transaction context is executed.

20 Claims, 9 Drawing Sheets

(56) References Cited

U.S. PATENT DOCUMENTS

| | | | |
|---|---|---|---|
| 10,019,320 B2 * | 7/2018 | Talagala | G06F 11/1441 |
| 10,282,307 B1 * | 5/2019 | Escriva | G06F 16/2255 |
| 2003/0140085 A1 * | 7/2003 | Moir | G06F 9/52 |
| | | | 718/107 |
| 2004/0015642 A1 * | 1/2004 | Moir | G06F 9/526 |
| | | | 711/1 |
| 2006/0173885 A1 * | 8/2006 | Moir | G06F 9/467 |
| 2011/0125973 A1 * | 5/2011 | Lev | G06F 9/5016 |
| | | | 711/153 |
| 2012/0311395 A1 * | 12/2012 | Leggette | G06F 3/0644 |
| | | | 714/752 |
| 2016/0357791 A1 * | 12/2016 | Levandoski | G06F 12/1009 |
| 2020/0257529 A1 | 8/2020 | Dhuse | |

OTHER PUBLICATIONS

List of IBM Patents or Patent Applications Treated as Related, dated Sep. 15, 2020, 1 page.
Office Action dated Jul. 14, 2021 in U.S. Appl. No. 16/514,617, 14 pages.

* cited by examiner

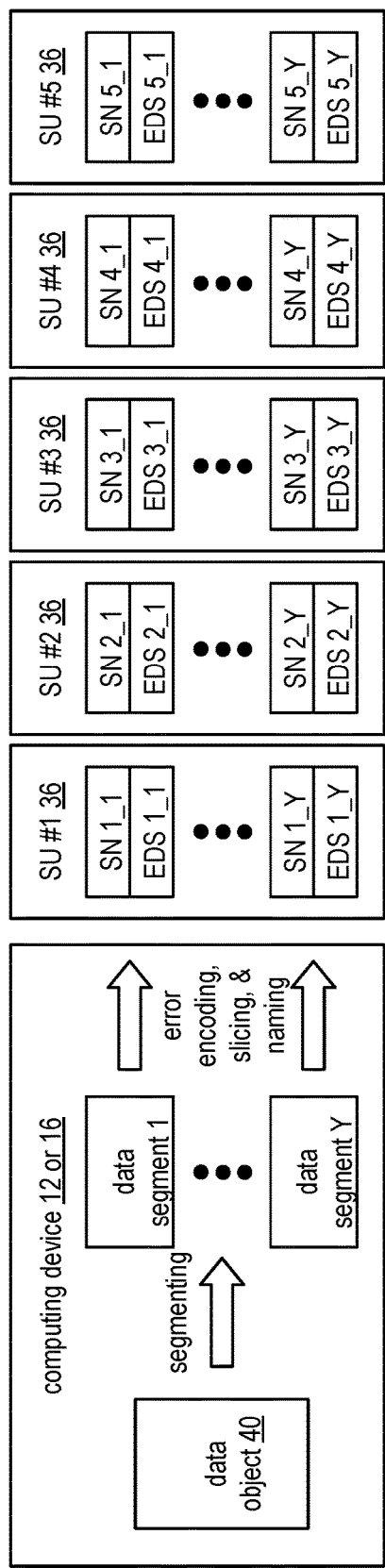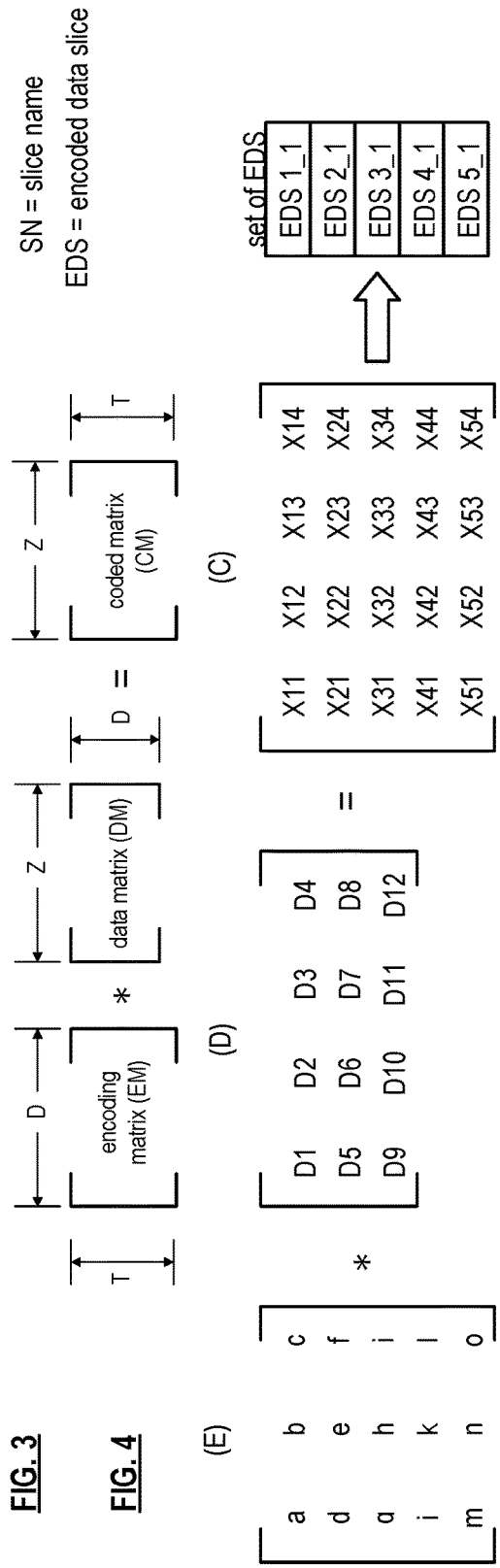
FIG. 3
FIG. 4
FIG. 5
FIG. 6

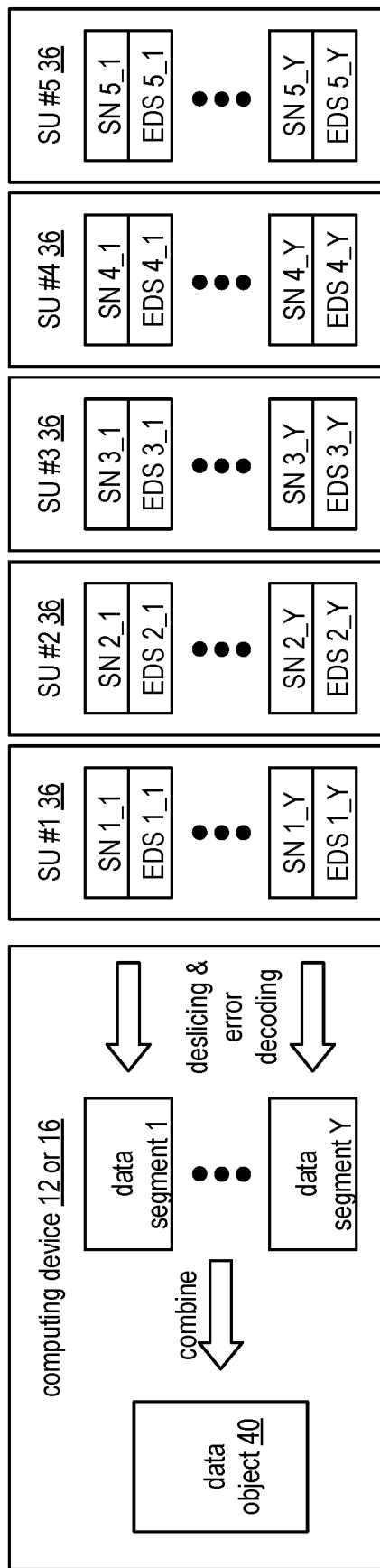

PERFORMING COMPOSABLE TRANSACTIONS IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
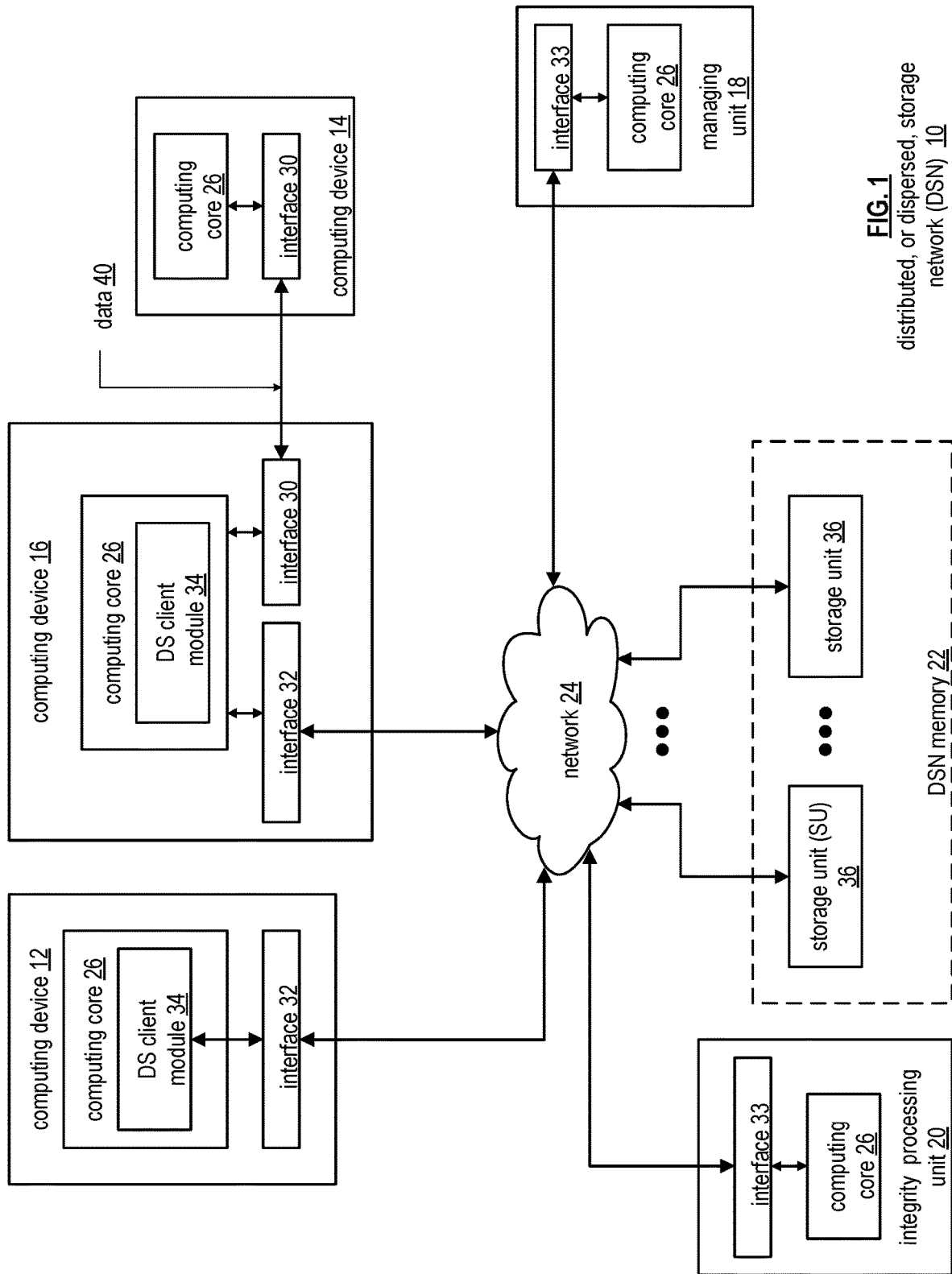
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
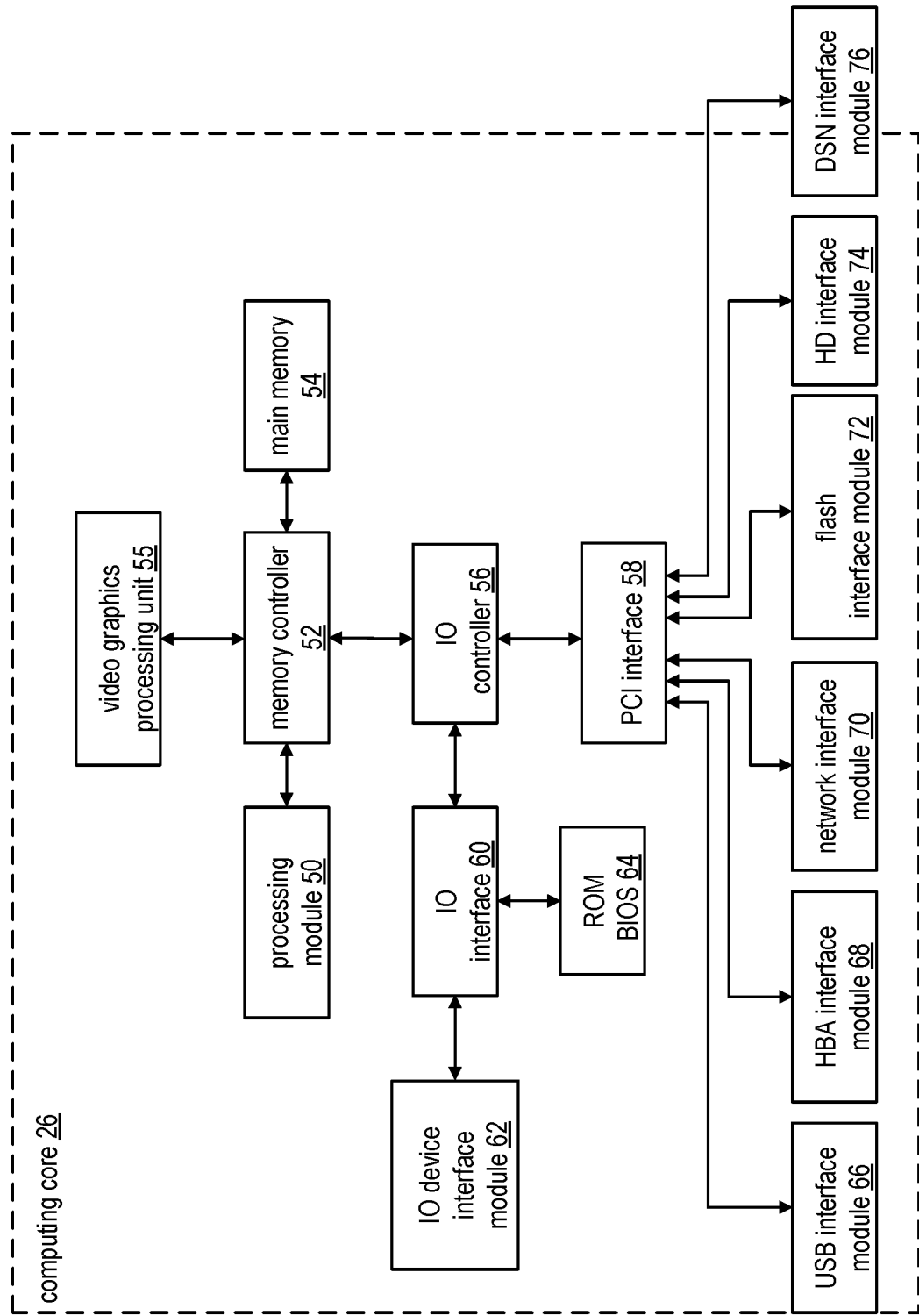
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
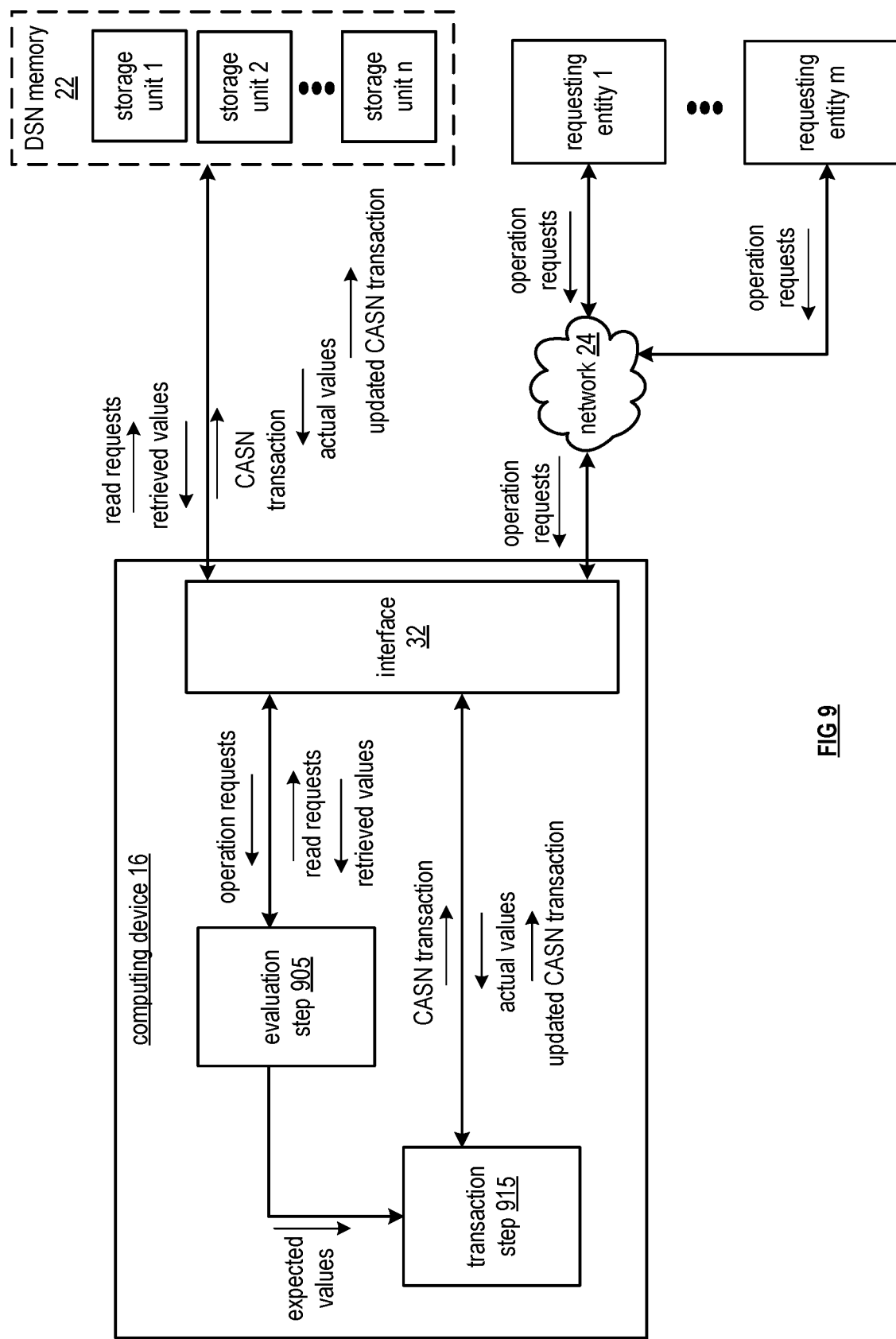
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a computing device 16 FIG. 1, the network 24 of FIG. 1, and a plurality of storage units 1-n of a DSN memory 22 of FIG. 1. The computing device 16 can include the interface 32 of FIG. 1, the computing core 26 of FIG. 1, and/or the DS client module 34 of FIG. 1. The computing device 16 can function as a dispersed storage processing agent for computing device 14 as described previously, and may hereafter be interchangeably referred to as a distributed storage and task (DST) processing unit.

The storage units 1-n can be implemented by utilizing the storage units 36 of FIG. 1, and can belong to the same DSN memory 22 or different DSN memories 22 of FIG. 1. The storage units 1-n can be implemented by utilizing any overlapping and/or non-overlapping sources. For example, the storage units can store overlapping data, can store dispersed encoded slices of the same data object, and/or perform tasks on overlapping data. The DSN functions to perform multiple arbitrary operations in a dispersed storage network utilizing a single atomic dispersed transaction. In particular, computing device 16 can generate transactions for composite operations on content of the storage devices 1-n by utilizing a DS client module 34.

Operations running on a DST processing unit utilize a CASN dispersed transaction protocol for consistent multi-source updates. In many cases, it is desirable to compose multiple operations into a single atomic update without requiring any update to be explicitly aware of the others. For example, one user may wish to update two data sources in a single transaction while another user may wish to update one data source along with one or more operations utilizing a lockless concurrency protocol, such as entries of a dispersed lockless concurrent index, in a single transaction. In order to facilitate both of these requests along with any other possible combination, the present invention functions to support composition of arbitrary operations.

To facilitate this composition, operations can be executed in a transaction context that abstracts read and write requests to the DSN memory by performing an evaluation step 905. This can correspond to an empty transaction context, and can allow individual operations to transparently read and write sources that may overlap, where later reads see writes made earlier in the transaction, for example, without actually committing any operations on the actual content in memory. The execution of the individual operations in the transaction context that abstracts read and write requests to the DSN memory can be performed locally or otherwise evaluated to determine an expected outcome of the multiple, individual operations. Performing this evaluation can include reading the current content of one or more memory locations within one or more storage units that are affected by the transaction, and can further include locally performing the operations of the transaction on the current content to generate the expected outcome.

Once the evaluation of evaluation step 905 is complete, a transaction can be created from the resulting context, indicating this expected outcome of the evaluation. The transaction can be a multi-word compare and swap (CASN) transaction and/or another compare and swap (CAS) transaction. In particular, CASN transaction can be executed against the DSN memory, which may succeed or fail with a conflict. For example, if the expected outcome of all content stored in one or more memory location, determined in the evaluation and affected by the operations of the transaction, matches the actual outcome of the content stored in one or more memory location resulting in performing the transaction, the transaction can be determined to succeed and the operations can be committed by one or more storage units or other processing systems managing the one or more memory locations. If the expected outcome of any content stored in any memory locations determined in the evaluation does not match a corresponding actual outcome of corresponding content stored in a corresponding one or more memory locations, the transaction can be determined to fail and the operations of the transaction can be reverted and/or abandoned by one or more storage units or other processing systems managing the one or more memory locations.

In the case of a failure due to a conflict, the transaction, and/or one or more individual operations of the transaction, can be re-attempted in a new context. In some embodiments, this new context can be pre-populated with the conflicting values from the preceding attempt in order to reduce the need to re-read these values in the subsequent evaluation. In particular, the actual outcomes of performing the transaction, determined in performing the CASN transaction that conflicted with the expected outcomes, can be received by the DST processing unit in performing the CASN transaction, and the DST processing unit can replace the expected outcomes of the previous evaluation to generate the expected outcomes of the new context. As another example, the current, unaltered values prior to performance of the transaction stored in the DSN, determined in attempting to perform the transaction, can replace initial values previously utilized to evaluate the composite operation, and a re-evaluation can be performed to update the CASN transaction, where new expected outcomes are determined by serially performing operations on these updated initial values.

In some embodiments, independent operations in a composite operation can execute in parallel when they are determined to be disjoint operations. Disjoint operations correspond to operations that do not overlap on any source, for example, where the content and/or memory locations affected by the operations do not overlap. Running multiple, disjoint operations in parallel can further reduce latency while still ensuring that the operations will have the intended outcome as they will not be affected by concurrently running operations already determined to be disjoint.

First, independent operations can be evaluated in parallel in isolated transaction contexts, and/or can otherwise be evaluated separately to determine. This can include evaluating each operation in their own isolated contexts by based reading the relevant content from indicated memory locations of each operation, and by locally performing the operation to independently generate expected outcomes. Determining the operations are disjoint can include determining the affected content and/or affected memory locations are independent and/or nonoverlapping. Determining the operations are not disjoint and instead overlapping operations can include determining the affected content and/or affected memory locations overlap and/or that performance of one operation otherwise affects the outcome of performance of the other operation.

If multiple independent operations are determined to be disjoint as a result of their evaluation in parallel in isolated transaction contexts, they can be designated for execution in parallel and/or otherwise can be concurrently execution. Rather than being designated to be performed in series in a single transaction, two separate transactions that include non-overlapping operations can be generated, and can be executed concurrently or otherwise in parallel as their results will not affect each other. As another example, a composite operation or transaction that includes the disjoint operations can include a designation and/or instruction to perform these disjoint operations parallel. As another example, the disjoint operations can be safely merged into composite operation for serial execution in any order. In this case, there is no need to re-evaluate the multiple operations in series, and their expected outcomes determined in their independent evaluations in the isolated contexts can be combined to indicate all expected outcomes of performing all the disjoint operations of the composite operation, where this combined expected outcome is utilized in performing the CASN transaction for the composite operation.

If multiple independently evaluated operations are determined to overlap based on evaluating these operations in the isolated contexts, these operations can be re-evaluated in series in a single context. An ordering of serial re-evaluation of the multiple operations can be determined based on timestamp, scheduling information, and/or designated ordering information of the operations. This can include re-reading the content from the relevant memory locations, and/or the reads from the isolated evaluations can be utilized again. The operations can be locally performed on current values indicated by the reads, one at a time in accordance with the determined ordering to determine the expected outcome of performing the multiple operations. This final expected outcome can be utilized in performing the CASN transaction for comparison against the actual change in content.

To compose and execute a collection of independent operations in a single transaction, a DST processing unit can initialize a composite operation from a plurality of independent operations. For example, some or all of the plurality of independent operations can be determined based on one or more user requests, received from one or more requesting entities via the network, determined by the DST processing unit based on configuration information and/or or an internal process, and/or can otherwise be determined. As illustrated in FIG. 9, a plurality of operation requests can be received from a plurality of requesting entities 1-*m* via the network.

The DST processing unit can create an empty transaction context for the plurality of independent operations. This can include determining a serial ordering of the plurality of operations based on timestamp information, scheduling information and/or other determined ordering for some or all of the plurality of independent operations. The composite operation can be evaluated in the empty transaction context by performing evaluation step 905 on the plurality of operations. This can include servicing any read operations of the composite operation.

Read operations can be evaluated by first attempting to read from the transaction context. For example, this can include determining the read locally based on transactions performed thus far in the evaluation, such as a previous write operation of the composite operation that was performed on corresponding content and/or a corresponding memory location, where the outcome of the write operation was evaluated. In particular, the read can be determined based on the outcome of the corresponding content and/or a corresponding memory location thus far as a result of performing multiple update operations on determined, initial content, in the evaluation of the composite operation thus far.

If reading from the transaction context fails, for example, because no other operations of the composite operations involved writes to the corresponding content and/or memory location, the DST processing unit can next attempt to perform the read from a local cache. For example, the corresponding content may have already been retrieved recently, for example where a recency of the data stored in the local cache compares favorably to a recency threshold. In particular, in performing the current evaluation of the composite operation, a previous read of the same content and/or from the same memory location may have been already performed, and this result may be stored in the local cache if not indicated in the transaction context, for example, due to no write operations to the corresponding content and/or memory location. As another example, the transaction may have been pre-populated with conflicting values that were determined in a failed attempt to execute a prior CASN transaction for the composite operations.

If reading from the local cache also fails, for example, because no other operations of the composite operations involved operations on the corresponding content and/or memory location and/or because the corresponding content and/or memory location was not accessed recently, the DST processing unit can next attempt to perform the read against the DSN memory. This can include generating a read request for the corresponding data for transmission to one or more storage units via the network, as illustrated in FIG. 9, and the retrieved values can be received in response from the one or more storage units for use. Subsequent operations performed on the corresponding content in the evaluation can utilize this retrieved value rather than necessitating performance of additional reads to the DSN for the same content, as the retrieved value and any updates to the retrieved value in subsequently performed operations of the evaluation will be stored as part of the transaction context.

Alternatively or in addition, this can include determining to read at least one data segment indicated in the read operation, where the data segment was previously dispersed storage error encoded by the DST processing unit or by another entity into a plurality of encoded data slices that are stored in a plurality of storage units. At least a decode threshold number of encoded data slices of the plurality of encoded data slices can be retrieved from a decode threshold number of the plurality of storage units. The data segment can be recovered by performing a dispersed storage error decode function on the received encoded data slices, for example, where the result of the evaluation of the read operation includes the data segment. Alternatively, evaluation of the read operation can include one or more individual data slices of the same and/or different data segments retrieved from the same and/or different storage unit of the DSN.

Evaluating the composite operation in the empty transaction context in performing evaluation step 905 can include servicing any write and/or delete operations of the composite operation. This can include updating the transaction context with the newly written value. For example, if the transaction context already includes a previous value, the value stored in the transaction context can be updated accordingly. If the transaction context does not already include a value for the corresponding content and/or memory location of the write and/or delete, the DST processing unit can read the corresponding value from the local cache, or from the DSN via the network if not stored in the local cache, and the current value indicated by retrieving the corresponding content can be updated locally based on the write and/or delete operation, for example, where local memory corresponding to the transaction context is updated to include the updated value of the content.

When this evaluation is complete one or more determined values of one or more memory locations accessed by and/or affected by the operations of the composite operation can be included in the transaction context and/or can otherwise be stored locally in performing the evaluation as described above. This can be utilized in transaction step 915 to create a CASN transaction from the resulting transaction context of evaluation step 905, based on the final values of content and/or memory locations determined in the evaluation and based on the plurality of operations of the composite operations.

Once created, transaction step 915 can further include executing the CASN transaction can against the DSN memory. For example, the actual updated values of the accessed and/or affected content and/or memory locations are compared to the expected final values determined in the evaluation. Transaction step 915 can include transmitting subsets of operations of the CASN transaction to corresponding storage units that store the corresponding content and/or include the corresponding memory locations. Actual values that result in performing the operations of the CASN transaction by the storage units can be determined, and a transaction step 915 can include performing a comparison of the actual values received from the storage units to the expected values locally by the computing device 16, and/or can include receiving results of individual comparisons made by each storage unit to determine whether the comparisons made by all of the storage units are favorable.

If all values are determined to match, the composite operation is completed successfully, for example, where the reads are transmitted back to requesting entities, and/or where the storage units are notified of the success. This can allow the updates to the data to be committed in the storage units, and/or allowing the corresponding memory locations to be unlocked by the storage units for other transactions. If one or more values do not match and/or if the CASN transaction is otherwise determined to fail due to conflict, the storage units can be notified that any updates should be reverted, and/or a new transaction context can be created and can be pre-populated with the conflicting values. In particular the actual values generated by performing the transaction that did not match the corresponding expected values can utilized as the expected values in the new transaction context to be compared to newly generated actual values in a subsequent run of the CASN transaction. Alternatively, the current values stored in the storage units can be utilized to pre-populate the new transaction context as initial values on which the plurality of operations are performed in the evaluation to generate updated expected values.

As illustrated in FIG. 9, this updated transaction can be sent to the storage units, and if the actual values match the updated expected values, this second iteration of composite operation is completed successfully. If one or more values continue to not match, this process of re-populating the transaction context and re-attempting the transaction can continue any number of times. The transaction can be re-scheduled and/or abandoned in response to a threshold number of consecutive fails and/or a threshold amount of time elapsing. In some embodiments, one or more individual operations are removed from the transaction and/or the composite operation is divided into multiple, smaller composite operations in response to the transaction failing a threshold number of times.

In an example of performing the CASN transaction, a storage unit performing operations of the transaction can perform this comparison given at least one expected value of a memory location determined in evaluating the transaction, received in conjunction with the operations of the transaction targeted for the storage unit. The content will only be updated in the memory location of the storage unit and/or reads of the content will only be performed if the expected updated content matches the actual update to the content. One or more storage units performing operations of the transactions can indicate a failure, for example, for transmission to the computing device 16, if performing the update does not result in the expected updated content. For example, a failure can occur if content of one or more locations were changed by another operation, or can occur if a transaction was not able to be completed in its entirety.

In another example of performing the CASN transaction, as memory locations of multiple storage units may be updated in the composite operation, each storage unit can send the updated value that will be stored as a result of performing the operation back to the computing device 16, and can lock the corresponding memory locations. The computing device 16 can send confirmation notifications to the respective storage units in response to receiving updated content from all of the storage units that matches the expected updated content generated by performing the evaluation. The computing device can determine that failure notifications will be sent to the respective storage units in response to receiving updated content from one of the storage units that does not match the corresponding expected updated content indicated in the cached values of the new batch. If a storage unit receives a confirmation notification from the computing device, indicating that the transaction was successful across all storage units, the storage unit can complete storage of the updated value and can unlock the corresponding memory location. If a storage unit receives a failure notification, indicating that the transaction was unsuccessful in at least one storage unit, the storage unit can revert to the original content and unlock the corresponding memory location of the new batch.

In some embodiments, some or all of the plurality of operations can be determined based on determining to write a data segment. A dispersed storage error encoding function can first be locally performed on data segment for storage. At least some of the plurality of operations can correspond to a plurality of write operations to write the encoded data slices of the data segment to an information dispersal algorithm (IDA) width threshold number of storage units of the DSN. These write operations of the composite operation can be determined to be overlapping as they affect the same data segment and are thus not independent.

In some embodiments, some or all of the plurality of operations can be determined based on determining to read a data segment by retrieving at least an IDA decode threshold number of encoded data slices from at least a corresponding IDA decode threshold number of storage units, where at least some of the plurality of operations correspond to a plurality of read operations to read the IDA decode threshold number encoded data slices from the corresponding IDA decode threshold number of storage units. These read operations of the composite operation can be determined to be overlapping as they affect the same data segment and are thus not independent. The data segment can then be locally recovered by performing a dispersed storage error decoding function on the retrieved encoded data slices.

In various embodiments, a processing system of a dispersed storage and task (DST) processing unit includes at least one processor and a memory that stores operational instructions, that when executed by the at least one processor cause the processing system to initialize a composite operation from a plurality of independent operations. An empty transaction context is created by performing an evaluation of the composite operation. A multi-source compare and swap (CASN) transaction is created from resulting expected values determined by evaluating the composite operation in the empty transaction context. The CASN transaction is executed against a dispersed storage network (DSN) memory. When the execution of the CASN transaction is successful, the transaction is committed to the DSN memory. When the execution failed due to at least one conflicting value stored in the DSN memory, a new transaction context pre-populated with the at least one conflicting value is created, and an updated CASN for the composite operation that utilizes the pre-populated values of the new transaction context is executed.

Figure 10:
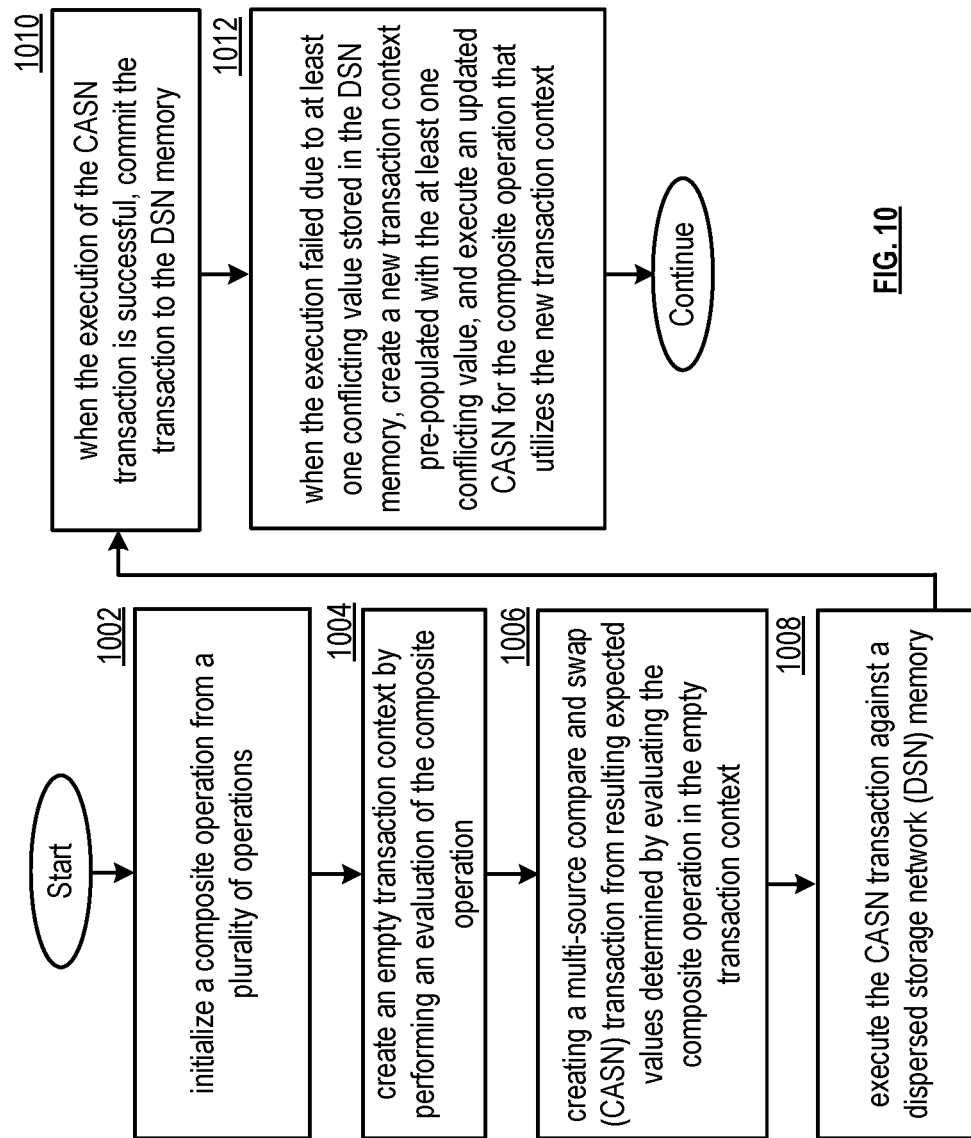
FIG. 10 is a logic diagram of an example of a method of utilizing composable transactions in accordance with the present invention.

FIG. 10 is a flowchart illustrating an example of performing composite operations. In particular, a method is presented for use in association with one or more functions and features described in conjunction with FIGS. 1-9, for execution by a dispersed storage and task (DST) processing unit that includes a processor or via another processing system of a dispersed storage network that includes at least one processor and memory that stores instruction that configure the processor or processors to perform the steps described below.

Step 1002 includes initializing a composite operation from a plurality of operations. Step 1004 includes creating an empty transaction context by performing an evaluation of the composite operation. Step 1006 includes creating a multi-source compare and swap (CASN) transaction from resulting expected values determined by evaluating the composite operation in the empty transaction context. Step 1008 includes executing the CASN transaction against a dispersed storage network (DSN) memory. Step 1010 includes committing the transaction to the DSN memory when the execution of the CASN transaction is successful. Step 1012 includes creating a new transaction context pre-populated with the at least one conflicting value, and executing an updated CASN for the composite operation that utilizes the new transaction context when the execution failed due to at least one conflicting value stored in the DSN memory, for example, by utilizing the pre-populated values.

In various embodiments, executing the CASN transaction includes generating comparison data by comparing the resulting expected values to corresponding resulting values created by performing the plurality of operations on data stored in the DSN memory. The execution of the CASN transaction is determined to be successful when the comparison data indicates all of the corresponding resulting values match the resulting expected values. The execution of the CASN transaction is determined to fail when the comparison data indicates at least one of the corresponding resulting values does not match at least one resulting expected value.

In various embodiments, the at least one of the corresponding resulting values that does not match the at least one resulting expected value corresponds to the at least one conflicting value, and the new transaction context is created by replacing the at least one resulting expected value with the corresponding resulting values. In various embodiments, the new transaction context is instead created by replacing at least one initial value that was utilized in evaluating the composite transaction with at least one current value stored in DSN memory that resulted in the at least one conflicting value when operations of the transaction were performed on the current value. The composite operation is re-evaluated by serially performing the operations on the updated at least one initial value, set to the at least one current value, to generate updated resulting expected values, where the updated CASN utilizes the updated resulting expected values.

In various embodiments, evaluating the composite operation includes determining a plurality of memory locations in a plurality of storage units indicated in the plurality of operations. A plurality of read operations for content stored in the plurality of memory locations are generated for transmission to the plurality of storage units, and a plurality of read responses are received from the plurality of storage units, indicating retrieved current values of the content stored in the plurality of memory locations. The retrieved current values of the content are utilized as initial values, the plurality of operations are serially performed on the retrieved current values locally to determine the resulting expected values. In various embodiments, evaluating the composite operation further includes determining an ordering of the plurality of operations based on timestamp data for the plurality of operations and/or scheduling data for the plurality of operations. The plurality of operations are serially performed on the initial values to determine the resulting expected values in accordance with the ordering.

In various embodiments, evaluating the composite operation includes evaluating each one of the plurality of operations serially. Evaluating ones of the plurality of operations that correspond to a read operation includes determining whether the read operation can be performed on corresponding values of the transaction context by determining whether the corresponding values have already been determined for prior, serially evaluated ones of the plurality of operations in evaluating the composite operation. When the read operation can be performed on corresponding values of the transaction context because the corresponding values have already been determined for the prior, serially evaluated ones of the plurality of operations, the read operation is performed on the corresponding values determined for the prior, serially evaluated ones of the plurality of operations.

When the read operation cannot be performed on corresponding values of the transaction context because the corresponding values have not already been determined for the prior, serially evaluated ones of the plurality of operations, it is then determined whether the read operation can be performed on corresponding values stored in a local cache by determining whether the corresponding values are stored in the local cache. When the read operation can be performed on corresponding values stored in a local cache because the corresponding values are stored in the local cache, the read operation is performed on the corresponding values stored in the local cache. When the read operation cannot be performed on corresponding values stored in a local cache because the corresponding values are not stored in the local cache, the read operation is performed on the DSN by generating at least one read request for transmission to at least one storage unit storing the corresponding values via a network, and by receiving at least one response that includes the corresponding values from the at least one storage unit via the network.

In various embodiments, the plurality of operations include a set of update operations. Each update operation of the set of update operations corresponds to a write operation and/or a delete operation. Evaluating ones of the plurality of operations that correspond to an update operation of the set of update operations includes determining second corresponding values for the update operation that correspond to content updated by the update operation. The update operation is local performed on the second corresponding values to generate updated second corresponding values. The transaction context is updated by replacing the second corresponding values with the updated second corresponding values. Subsequently evaluated ones of the plurality of operations that access the content updated by the update operation are evaluated by utilizing the updated second corresponding values. In various embodiments, determining the second corresponding values includes reading the content by first evaluating a read operation for the content.

In various embodiments, the method further includes evaluating each of the plurality of operations independently to determine expected outcomes for each of the plurality of operations when performed independently. Overlap data is generated by comparing the expected outcomes to determine a disjoint subset of the plurality of operations. The disjoint subset of the plurality of operations includes operations that are determined not to affect the expected outcomes of any other ones of the plurality of operations. The disjoint subset of the plurality of operations is designated to be run in parallel in creating the CASN transaction.

In various embodiments, a plurality of memory locations in a plurality of storage units indicated in the plurality of operations are determined and a plurality of read operations are performed to receive retrieved current values of corresponding content in the plurality of memory locations. The retrieved current values are utilized as initial values in determining the expected outcomes by locally performing the plurality of operations on corresponding ones of the retrieved current values. A first subset of the resulting expected values corresponding to the disjoint subset of the plurality of operations are determined based on resulting expected values of the expected outcomes determined in independently performing the disjoint subset of the plurality of operations. An overlapping subset of the plurality of operations is determined, where the overlapping subset includes a set difference between the plurality of operations and the disjoint subset of the plurality of operations. The overlapping subset is serially of the plurality of operations on the retrieved current values locally to determine a second subset of the resulting expected values. The first subset of the resulting expected values and the second subset of the resulting expected values correspond to mutually exclusive content, and the first subset of the resulting expected values and the second subset of the resulting expected values are collectively exhaustive with respect to the resulting expected values.

In various embodiments, the overlapping subset of the plurality of operations includes a first operation that includes an update to a portion of a data object stored in one of a plurality of storage units. The overlapping subset of the plurality of operations includes a second operation that includes an access to another portion of the data object stored in another one of the plurality of storage units. The first operation and the second operation are determined to be overlapping in response to determining they both include access to the data object.

In various embodiments, the plurality of operations includes updates to a plurality of set of encoded data slices, where each set of encoded data slices is associated with one of a plurality of data segments, and where each one of the plurality of data segments was dispersed storage error encoded to produce a corresponding set of encoded data slices for storage in a set of storage units. The overlapping subset of the plurality of operations includes a first operation that includes update to one encoded data slice of a set of encoded data slices corresponding to a data segment, and the overlapping subset of the plurality of operations includes a second operation that includes an update to another encoded data slice of the set of encoded data slices corresponding to the data segment. The first operation and the second operation are determined to be overlapping in response to determining they both update encoded data slices of the data segment.

In various embodiments, a non-transitory computer readable storage medium includes at least one memory section that stores operational instructions that, when executed by a processing system of a dispersed storage network (DSN) that includes a processor and a memory, causes the processing system to initialize a composite operation from a plurality of independent operations. An empty transaction context is created by performing an evaluation of the composite operation. A multi-source compare and swap (CASN) transaction is created from resulting expected values determined by evaluating the composite operation in the empty transaction context. The CASN transaction is executed against a dispersed storage network (DSN) memory. When the execution of the CASN transaction is successful, the transaction is committed to the DSN memory. When the execution failed due to at least one conflicting value stored in the DSN memory, a new transaction context pre-populated with the at least one conflicting value is created, and an updated CASN for the composite operation that utilizes the pre-populated values of the new transaction context is executed.

Figure 11:
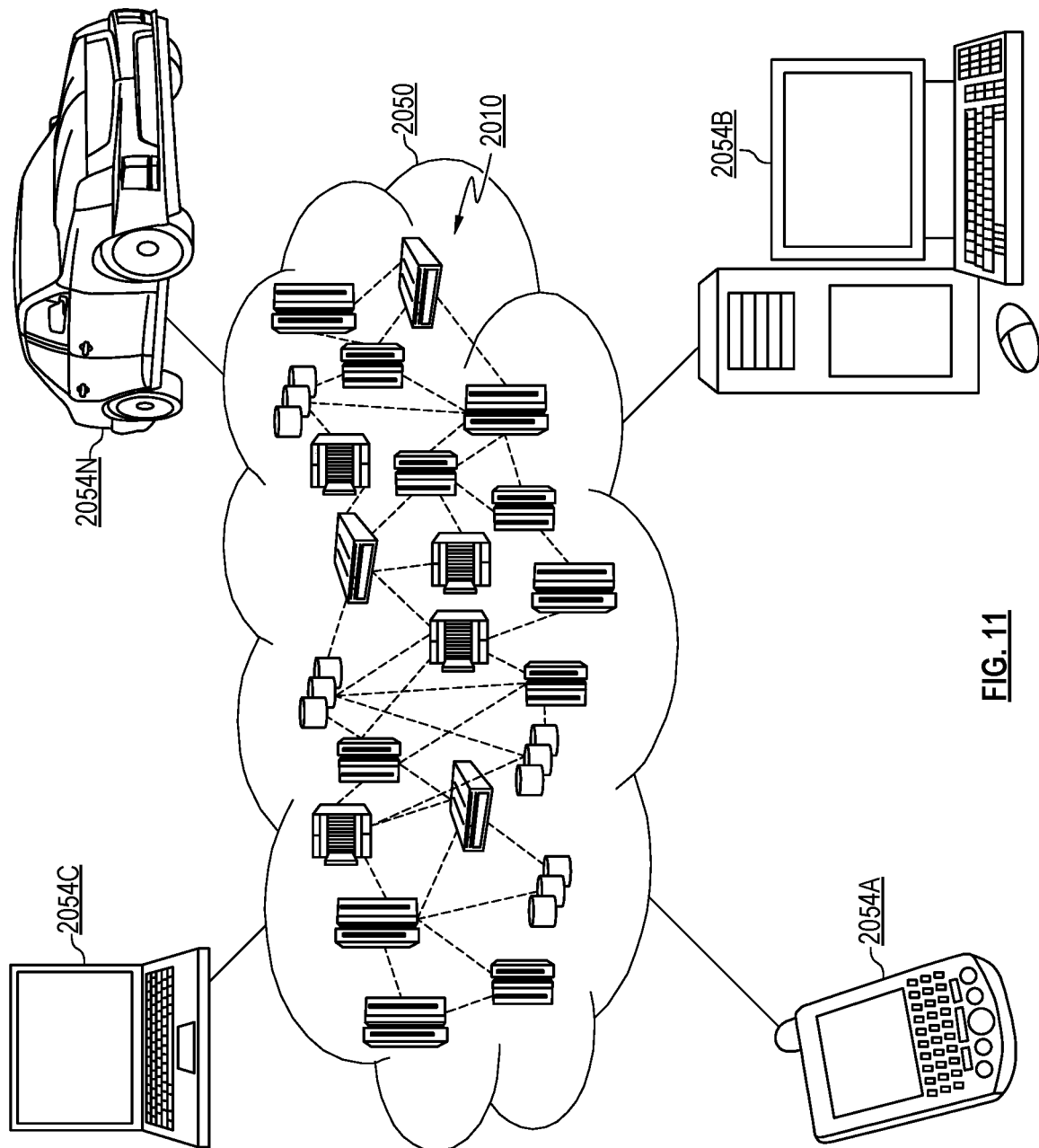
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
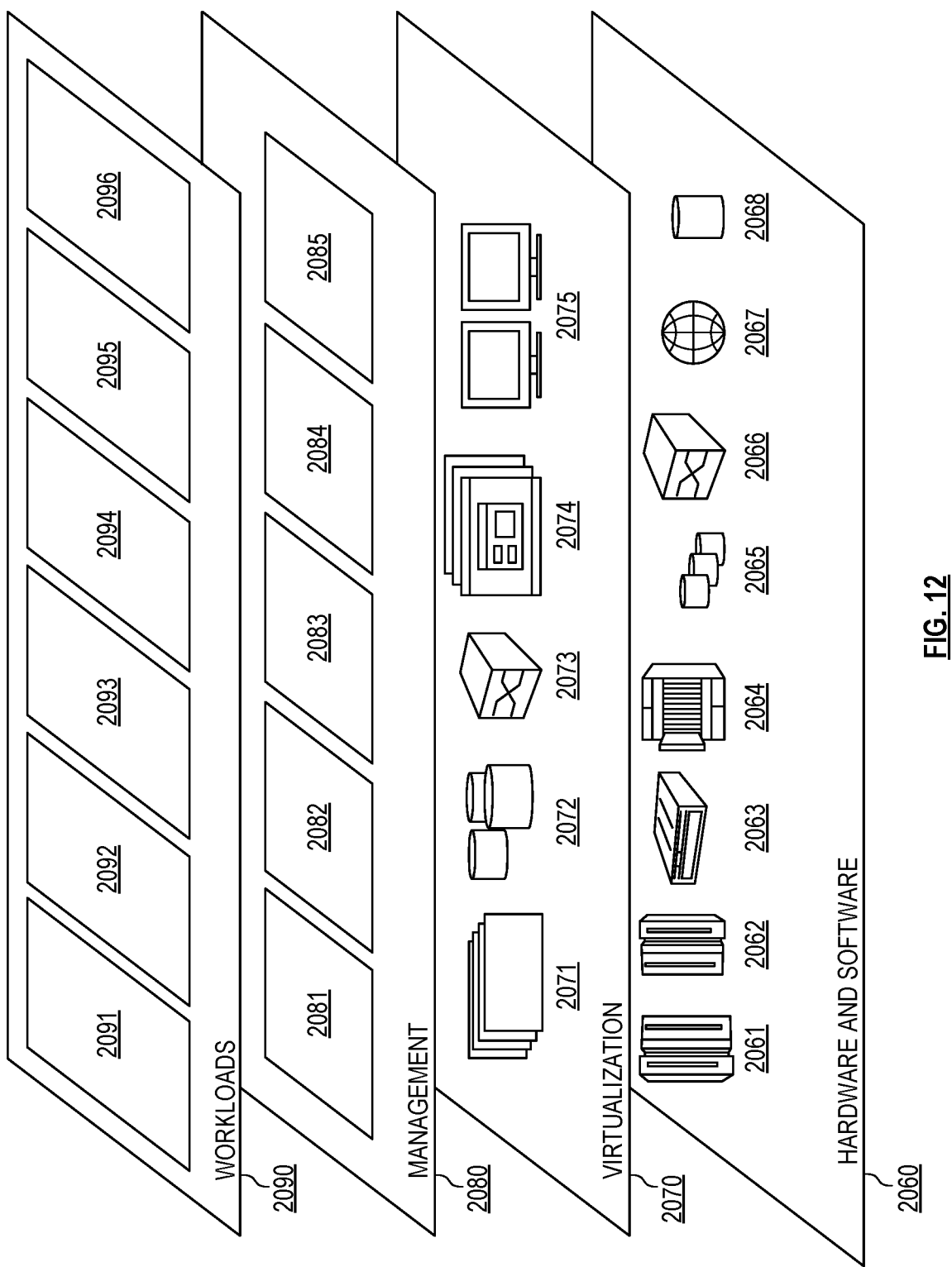
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and composable transaction system 2096. In some embodiments, the DSN 10 can utilize utilizing the cloud computing environment 2050, for example, by utilizing the composable transaction system 2096 of the workloads layer 2090 of FIG. 12 to perform composable transactions in the DSN as described in conjunction with FIGS. 9-10, where some or all computing devices 12-16 of FIG. 1 communicate with the network via a corresponding node 2010 of the cloud computing environment 2050.

Figure 13:
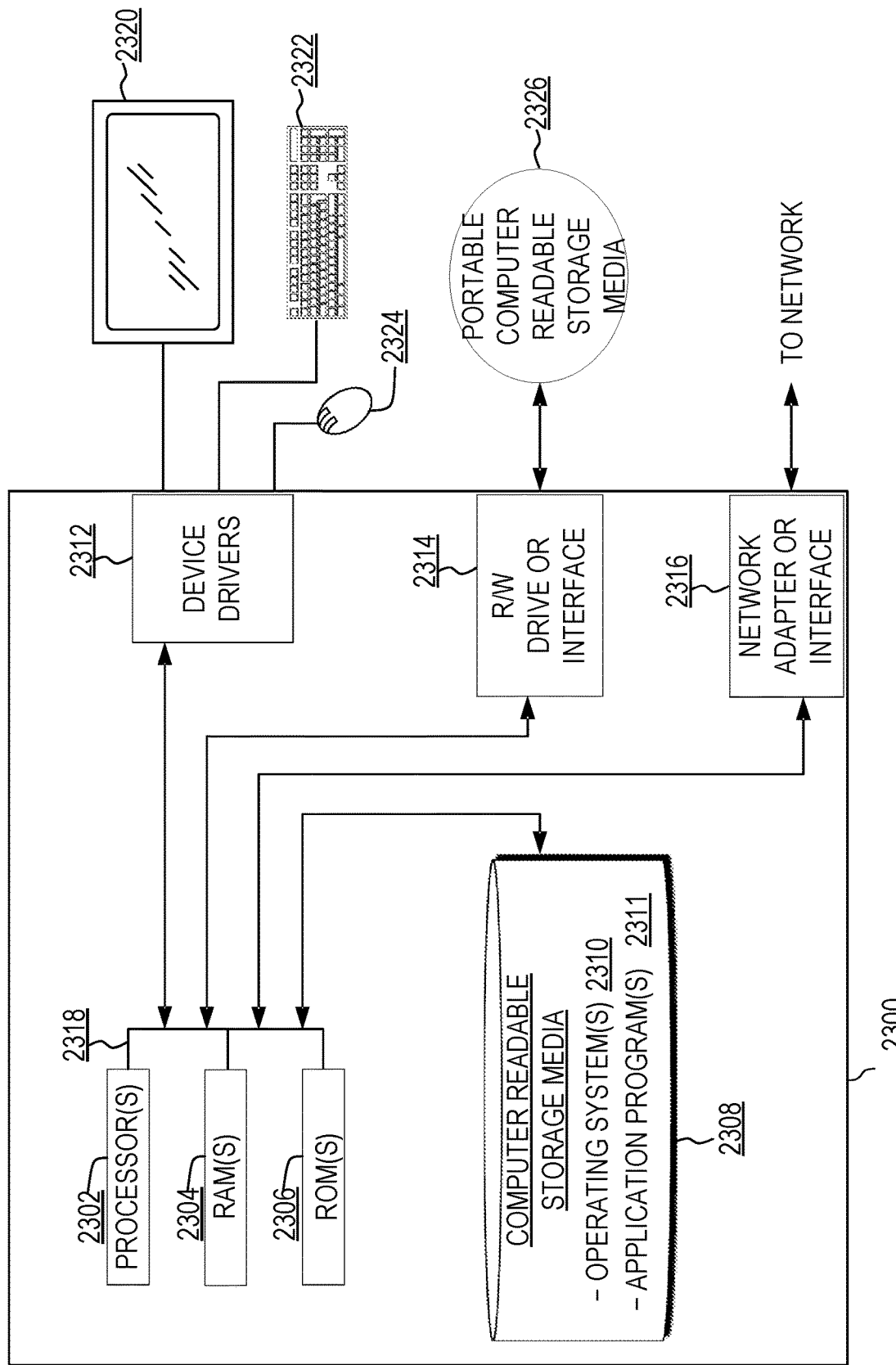
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprises:
   initializing a composite operation from a plurality of operations;
   creating an empty transaction context by performing an evaluation of the composite operation;
   creating a multi-source compare and swap (CASN) transaction from resulting expected values determined by evaluating the composite operation in the empty transaction context;
   executing the CASN transaction against a dispersed storage network (DSN) memory;
   when execution of the CASN transaction is successful, commit the transaction to the DSN memory; and
   when the execution failed due to at least one conflicting value stored in the DSN memory:
      creating a new transaction context pre-populated with the at least one conflicting value; and
      executing an updated CASN for the composite operation that utilizes the new transaction context,
   wherein the DSN memory includes a plurality of storage units; and
   the DST processing unit is configured to store a data object in the DSN memory by: dividing the data object into plural segments; producing a plurality of sets of encoded data slices from the plural segments; and providing the plurality of sets of encoded data slices with their respective slice names to the plurality of storage units for storage.

2. The method of claim 1, wherein executing the CASN transaction includes generating comparison data by comparing the resulting expected values to corresponding resulting values created by performing the plurality of operations on data stored in the DSN memory, wherein the execution of the CASN transaction is determined to be successful when the comparison data indicates all of the corresponding resulting values match the resulting expected values, and wherein the execution of the CASN transaction is determined to fail when the comparison data indicates at least one of the corresponding resulting values does not match at least one resulting expected value.

3. The method of claim 2, wherein the at least one of the corresponding resulting values that does not match the at least one resulting expected value corresponds to the at least one conflicting value, wherein the new transaction context is created by replacing at least one resulting expected value with the corresponding resulting values.

4. The method of claim 2, wherein the at least one of the corresponding resulting values that does not match at least one resulting expected value corresponds to the at least one conflicting value, wherein the new transaction context is created by replacing at least one initial value that was utilized in evaluating the composite operation with at least one current value stored in DSN memory that resulted in the at least one conflicting value when operations of the transaction were performed on the current value, wherein the composite operation is re-evaluated by serially performing the operations on the at least one current value to generate updated resulting expected values, wherein the updated CASN utilizes the updated resulting expected values.

5. The method of claim 1, wherein evaluating the composite operation includes:
   determining a plurality of memory locations in a respective plurality of storage units indicated in the plurality of operations;
   generating a plurality of read operations for content stored in the plurality of memory locations for transmission to the respective plurality of storage units;
   receiving a plurality of read responses from the respective plurality of storage units indicating retrieved current values of the content stored in the plurality of memory locations; and
   utilizing the retrieved current values of the content as initial values to serially perform the plurality of operations on the retrieved current values locally to determine the resulting expected values.

6. The method of claim 5, wherein evaluating the composite operation further includes:
   determining an ordering of the plurality of operations based on at least one of: timestamp data for the plurality of operations or scheduling data for the plurality of operations;
   wherein the plurality of operations are serially performed on the initial values to determine the resulting expected values in accordance with the ordering.

7. The method of claim 1, wherein evaluating the composite operation includes evaluating each one of the plurality of operations serially, wherein evaluating ones of the plurality of operations that correspond to a read operation includes:
   determining whether the read operation can be performed on corresponding values of the transaction context by determining whether the corresponding values have already been determined for prior, serially evaluated ones of the plurality of operations in evaluating the composite operation;
   when the read operation can be performed on corresponding values of the transaction context because the corresponding values have already been determined for the prior, serially evaluated ones of the plurality of operations, performing the read operation on the corresponding values determined for the prior, serially evaluated ones of the plurality of operations;
   when the read operation cannot be performed on corresponding values of the transaction context because the corresponding values have not already been determined for the prior, serially evaluated ones of the plurality of operations, determining whether the read operation can be performed on corresponding values stored in a local cache by determining whether the corresponding values are stored in the local cache;

when the read operation can be performed on corresponding values stored in a local cache because the corresponding values are stored in the local cache, performing the read operation on the corresponding values; and when the read operation cannot be performed on corresponding values stored in a local cache because the corresponding values are not stored in the local cache, performing the read operation on the DSN by generating at least one read request for transmission to at least one storage unit of the plurality of storage units storing the corresponding values via a network, and by receiving at least one response that includes the corresponding values from the at least one storage unit via the network.

8. The method of claim 7, wherein the plurality of operations include a set of update operations, wherein each update operation of the set of update operations corresponds to one of: a write operation or a delete operation, and wherein evaluating ones of the plurality of operations that correspond to an update operation of the set of update operations includes:

determining second corresponding values for the update operation that correspond to content updated by the update operation;

locally performing the update operation on the second corresponding values to generate updated second corresponding values; and updating the transaction context by replacing the second corresponding values with the updated second corresponding values;

wherein subsequently evaluated ones of the plurality of operations that access the content updated by the update operation are evaluated by utilizing the updated second corresponding values.

9. The method of claim 8, wherein determining the second corresponding values includes reading the content by first evaluating a read operation for the content.

10. The method of claim 1, further comprising:

evaluating each of the plurality of operations independently to determine expected outcomes for each of the plurality of operations when performed independently;

generating overlap data by comparing the expected outcomes to determine a disjoint subset of the plurality of operations, wherein the disjoint subset of the plurality of operations includes operations that are determined not to affect the expected outcomes of any other ones of the plurality of operations; and designating the disjoint subset of the plurality of operations to be run in parallel in creating the CASN transaction.

11. The method of claim 10, further comprising:

determining a plurality of memory locations in a respective plurality of storage units indicated in the plurality of operations, and performing a plurality of read operations to receive retrieved current values of corresponding content in the plurality of memory locations;

utilizing the retrieved current values as initial values in determining the expected outcomes by locally performing the plurality of operations independently on corresponding ones of the retrieved current values;

determining a first subset of the resulting expected values corresponding to the disjoint subset of the plurality of operations based on resulting expected values of the expected outcomes determined in independently performing the disjoint subset of the plurality of operations;

determining an overlapping subset of the plurality of operations, wherein the overlapping subset includes a set difference between the plurality of operations and the disjoint subset of the plurality of operations;

serially performing the overlapping subset of the plurality of operations on the retrieved current values locally to determine a second subset of the resulting expected values, wherein the first subset of the resulting expected values and the second subset of the resulting expected values correspond to mutually exclusive content, and wherein the first subset of the resulting expected values and the second subset of the resulting expected values are collectively exhaustive with respect to the resulting expected values.

12. The method of claim 11, wherein the overlapping subset of the plurality of operations includes a first operation that includes an update to a portion of a respective data object stored in one of a respective plurality of storage units, wherein the overlapping subset of the plurality of operations includes a second operation that includes an access to another portion of the respective data object stored in another one of the respective plurality of storage units, and wherein the first operation and the second operation are determined to be overlapping in response to determining they both include access to the respective data object.

13. The method of claim 11, wherein the plurality of operations includes updates to a respective plurality of set of encoded data slices, wherein each respective set of encoded data slices is associated with one of a respective plurality of data segments, wherein each one of the respective plurality of data segments was dispersed storage error encoded to produce a corresponding set of encoded data slices for storage in a set of the plurality of storage units, and wherein the overlapping subset of the plurality of operations includes a first operation that includes update to one encoded data slice of a set of encoded data slices corresponding to a data segment, wherein the overlapping subset of the plurality of operations includes a second operation that includes an update to another encoded data slice of the set of encoded data slices corresponding to the data segment, and wherein the first operation and the second operation are determined to be overlapping in response to determining they both update encoded data slices of the data segment.

14. A processing system of a dispersed storage and task (DST) processing unit comprises:

at least one processor;

a memory that stores operational instructions, that when executed by the at least one processor cause the processing system to:

initialize a composite operation from a plurality of operations;

create an empty transaction context by performing an evaluation of the composite operation;

create a multi-source compare and swap (CASN) transaction from resulting expected values determined by evaluating the composite operation in the empty transaction context;

execute the CASN transaction against a dispersed storage network (DSN) memory;

when execution of the CASN transaction is successful, commit the transaction to the DSN memory; and when the execution failed due to at least one conflicting value stored in the DSN memory:
      create a new transaction context pre-populated with the at least one conflicting value; and
      execute an updated CASN for the composite operation that utilizes the new transaction context,
    wherein the DSN memory includes a plurality of storage units; and
  the DST processing unit is configured to store a data object in the DSN memory by: dividing the data object into plural segments; producing a plurality of sets of encoded data slices from the plural segments; and providing the plurality of sets of encoded data slices with their respective slice names to the plurality of storage units for storage.

15. The processing system of claim 14, wherein executing the CASN transaction includes generating comparison data by comparing the resulting expected values to corresponding resulting values created by performing the plurality of operations on data stored in the DSN memory, wherein the execution of the CASN transaction is determined to be successful when the comparison data indicates all of the corresponding resulting values match the resulting expected values, and wherein the execution of the CASN transaction is determined to fail when the comparison data indicates at least one of the corresponding resulting values does not match at least one resulting expected value.

16. The processing system of claim 14, wherein evaluating the composite operation includes:
  determining a plurality of memory locations in a respective plurality of storage units indicated in the plurality of operations;
  generating a plurality of read operations for content stored in the plurality of memory locations for transmission to the respective plurality of storage units;
  receiving a plurality of read responses from the respective plurality of storage units indicating retrieved current values of the content stored in the plurality of memory locations; and
  utilizing the retrieved current values of the content as initial values to serially perform the plurality of operations on the retrieved current values locally to determine the resulting expected values.

17. The processing system of claim 14, wherein evaluating the composite operation includes evaluating each one of the plurality of operations serially, wherein evaluating ones of the plurality of operations that correspond to a read operation includes:
  determining whether the read operation can be performed on corresponding values of the transaction context by determining whether the corresponding values have already been determined for prior, serially evaluated ones of the plurality of operations in evaluating the composite operation;
  when the read operation can be performed on corresponding values of the transaction context because the corresponding values have already been determined for the prior, serially evaluated ones of the plurality of operations, performing the read operation on the corresponding values determined for the prior, serially evaluated ones of the plurality of operations;
  when the read operation cannot be performed on corresponding values of the transaction context because the corresponding values have not already been determined for the prior, serially evaluated ones of the plurality of operations, determining whether the read operation can be performed on corresponding values stored in a local cache by determining whether the corresponding values are stored in the local cache;
  when the read operation can be performed on corresponding values stored in a local cache because the corresponding values are stored in the local cache, performing the read operation on the corresponding values; and
  when the read operation cannot be performed on corresponding values stored in a local cache because the corresponding values are not stored in the local cache, performing the read operation on the DSN by generating at least one read request for transmission to at least one storage unit of the plurality of storage units storing the corresponding values via a network, and by receiving at least one response that includes the corresponding values from the at least one storage unit via the network.

18. The processing system of claim 17, wherein the plurality of operations include a set of update operations, wherein each update operation of the set of update operations corresponds to one of: a write operation or a delete operation, and wherein evaluating ones of the plurality of operations that correspond to an update operation of the set of update operations includes:
  determining second corresponding values for the update operation that correspond to content updated by the update operation;
  locally performing the update operation on the second corresponding values to generate updated second corresponding values; and
  updating the transaction context by replacing the second corresponding values with the updated second corresponding values;
  wherein subsequently evaluated ones of the plurality of operations that access the content updated by the update operation are evaluated by utilizing the updated second corresponding values.

19. The processing system of claim 14, further comprising:
  evaluating each of the plurality of operations independently to determine expected outcomes for each of the plurality of operations when performed independently;
  generating overlap data by comparing the expected outcomes to determine a disjoint subset of the plurality of operations, wherein the disjoint subset of the plurality of operations includes operations that are determined not to affect the expected outcomes of any other ones of the plurality of operations; and
  designating the disjoint subset of the plurality of operations to be run in parallel in creating the CASN transaction.

20. A computer readable storage medium comprises:
  at least one memory section that stores operational instructions that, when executed by a processing system of a dispersed storage network (DSN) that includes a processor and a memory, causes the processing system to:
    initialize a composite operation from a plurality of operations;
    create an empty transaction context by performing an evaluation of the composite operation;
    create a multi-source compare and swap (CASN) transaction from resulting expected values determined by evaluating the composite operation in the empty transaction context;
    execute the CASN transaction against the dispersed storage network;

when execution of the CASN transaction is successful, commit the transaction to the DSN; and when the execution failed due to at least one conflicting value stored in the DSN:
  create a new transaction context pre-populated with the at least one conflicting value; and
  execute an updated CASN for the composite operation that utilizes the new transaction context, wherein the DSN memory includes a plurality of storage units; and the DST processing unit is configured to store a data object in the DSN memory by: dividing the data object into plural segments; producing a plurality of sets of encoded data slices from the plural segments; and providing the plurality of sets of encoded data slices with their respective slice names to the plurality of storage units for storage.

* * * * *